(12) United States Patent
Li et al.

(10) Patent No.: US 7,667,776 B2
(45) Date of Patent: Feb. 23, 2010

(54) VIDEO DISPLAY DEVICE, VIDEO ENCODER, NOISE LEVEL ESTIMATION MODULE AND METHODS FOR USE THEREWITH

(75) Inventors: Xinghai (Billy) Li, North York (CA); Xu Gang (Wilf) Zhao, Toronto (CA); Chun-Chin (David) Yeh, Thornhill (CA)

(73) Assignee: VIXS Systems, Inc., Toronto, Ontario (CA)

( * ) Notice: Subject to any disclaimer, the term of this patent is extended or adjusted under 35 U.S.C. 154(b) by 713 days.

(21) Appl. No.: 11/348,119

(22) Filed: Feb. 6, 2006

(65) Prior Publication Data

US 2007/0182862 A1 Aug. 9, 2007

(51) Int. Cl.
*H04N 5/21* (2006.01)
*H04N 7/12* (2006.01)

(52) U.S. Cl. .................... 348/607; 375/240.29
(58) Field of Classification Search ............ 375/240.26
See application file for complete search history.

(56) References Cited

U.S. PATENT DOCUMENTS

| | | | |
|---|---|---|---|
| 4,684,989 A | 8/1987 | Roeder et al. | |
| 5,361,105 A * | 11/1994 | Iu | 348/699 |
| 5,442,407 A * | 8/1995 | Iu | 348/620 |
| 5,519,456 A * | 5/1996 | Inamori | 348/699 |
| 5,657,401 A | 8/1997 | De Haan et al. | |
| 5,911,008 A * | 6/1999 | Niikura et al. | 382/236 |
| 5,969,777 A * | 10/1999 | Mawatari | 375/240.26 |
| 6,307,888 B1 | 10/2001 | Le Clerc | |
| 6,434,275 B1 * | 8/2002 | Fukuda et al. | 382/275 |
| 6,661,838 B2 * | 12/2003 | Koga et al. | 375/240 |
| 7,409,103 B2 * | 8/2008 | Nishi et al. | 382/275 |
| 2005/0271298 A1 * | 12/2005 | Yu | 382/286 |
| 2006/0215928 A1 * | 9/2006 | Obara | 382/268 |
| 2007/0019729 A1 * | 1/2007 | Nakagomi et al. | 375/240.13 |

* cited by examiner

*Primary Examiner*—Paulos M Natnael
(74) *Attorney, Agent, or Firm*—Garlick Harrison & Markison; Bruce E. Stuckman (57) ABSTRACT

A noise level estimation module includes a pixel block selection module for selecting a plurality of selected pixel blocks over a set of K fields of a video signal, each of the plurality of selected pixel blocks containing a plurality of pixels having corresponding pixel values. A difference calculation module calculates a block difference for each of the plurality of selected pixel blocks based on a pixel difference between the pixel value for each of the plurality of pixels and a pixel value for a corresponding pixel in an adjacent field. A signal generator generates a noise level estimation signal based on a subset of M block differences for the plurality of pixel blocks, wherein M is greater than one.

30 Claims, 13 Drawing Sheets

VIDEO DISPLAY DEVICE, VIDEO ENCODER, NOISE LEVEL ESTIMATION MODULE AND METHODS FOR USE THEREWITH

TECHNICAL FIELD OF THE INVENTION

The present invention relates to video noise level estimators and related methods used in devices such as video display devices.

DESCRIPTION OF RELATED ART

Video display devices are used in a wide variety of electronic equipment including televisions, computers and computer monitors, portable digital video disk (DVD) players, and other devices that provide a video display based on a video signal. In circumstances where the video signal is transmitted, processed, modified or otherwise reproduced, noise can be introduced on the video signal that detracts from the quality of the video that is displayed. Noise filters can be employed to reduce the amount of noise on the video signal in order to improve the picture quality. Many such noise filters rely upon an accurate estimate of the noise level. However, such estimates are difficult to produce because video noise can be difficult to distinguish from the video signal itself.

The need exists for noise level estimators that can be implemented efficiently, and that can provide more accurate estimates of the noise level present on a video signal.

SUMMARY OF THE INVENTION

The present invention sets forth a video display device, a video encoder, a noise level estimation module and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

Figure 1:
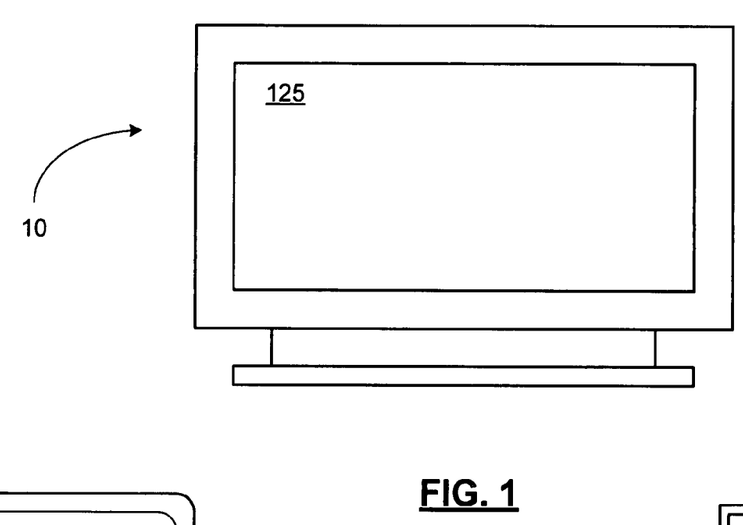
FIGS. 1-3 present pictorial diagram representations of a various video display devices in accordance with embodiments of the present invention.
Figure 2:
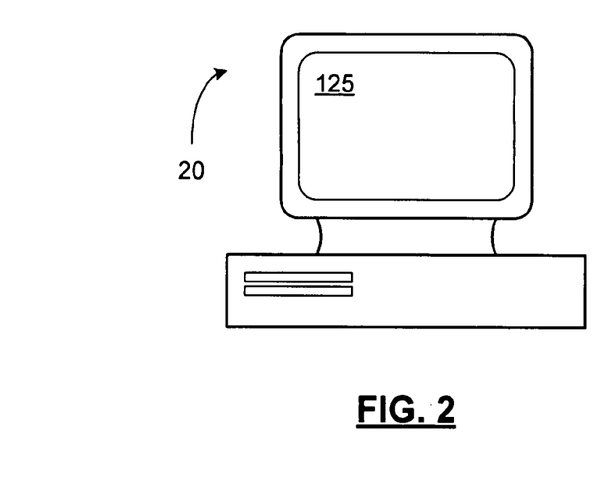
Figure 3:
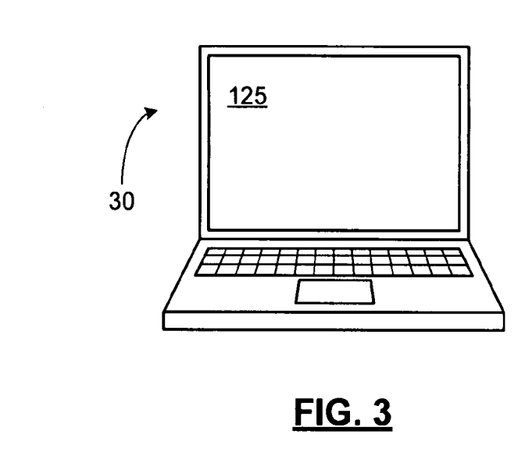

FIGS. 1-3 present pictorial diagram representations of a various video display devices in accordance with embodiments of the present invention. In particular, television 10, computer 20 and portable computer 30 illustrate electronic devices that incorporate a video display device 125 that includes one or more features or functions of the present invention. While these particular devices are illustrated, video display device 125 includes any device that is capable of displaying video content in accordance with the methods and systems described in conjunction with FIGS. 4-14 and the appended claims.

Figure 4:
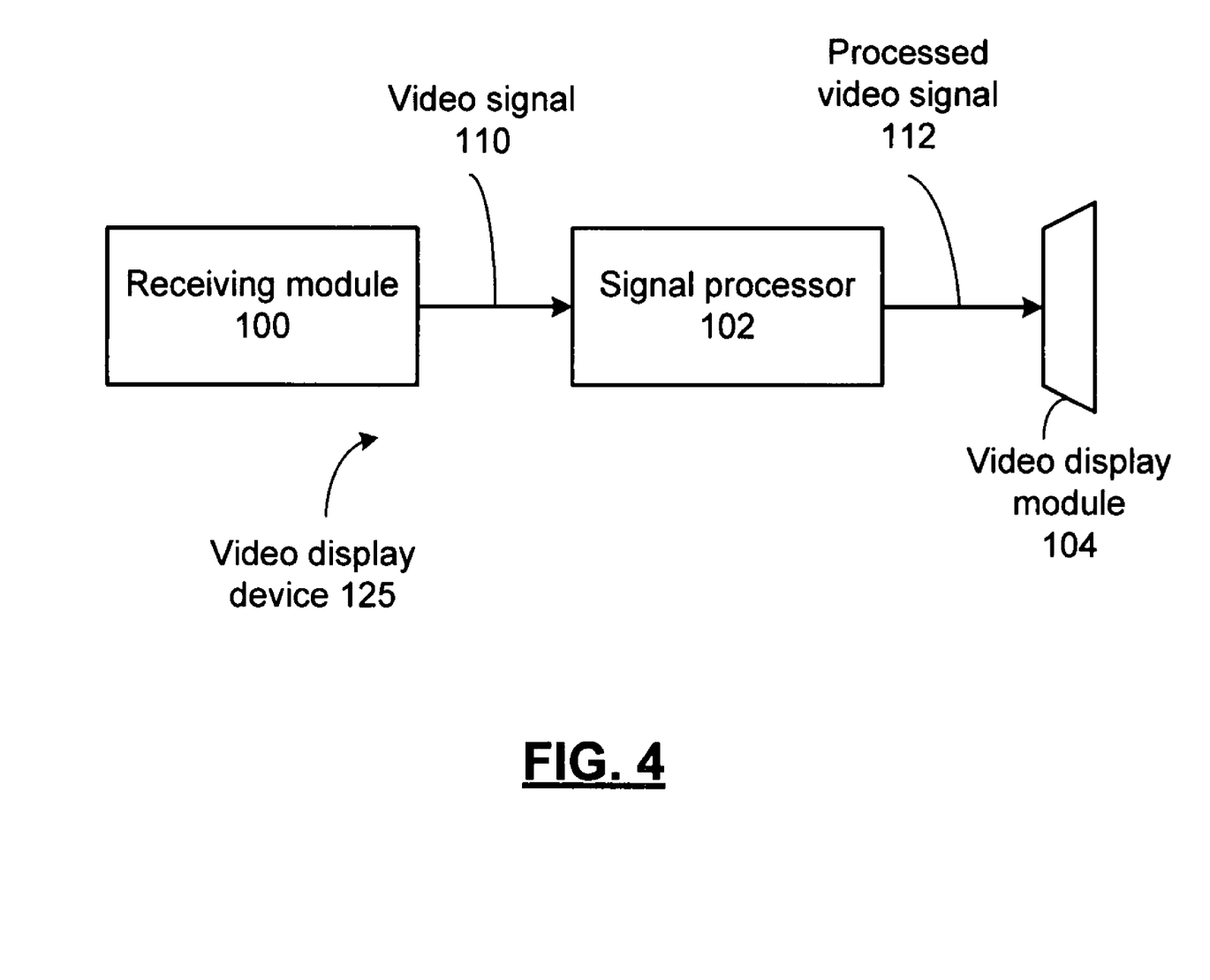
FIG. 4 presents a block diagram representation of a video display device in accordance with an embodiment of the present invention.

FIG. 4 presents a block diagram representation of a video display device in accordance with an embodiment of the present invention. In particular, video display device 125 includes a receiving module 100 for receiving a video signal. Signal processor 102 is operably coupled to the receiving module 100 for generating a processed video signal 112. Video display module 104 is operably coupled to the signal processor 102 for producing a video display based on the processed video signal 112.

In an embodiment of the present invention, the video signal 110 is a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, video signal 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Further, video signal 110 can be in a digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Video display module 104 can be a cathode ray tube (CRT), liquid crystal display (LCD), plasma screen or other display that creates an optical image based on processed video signal 112, either directly or indirectly, such as by projection.

Figure 6:
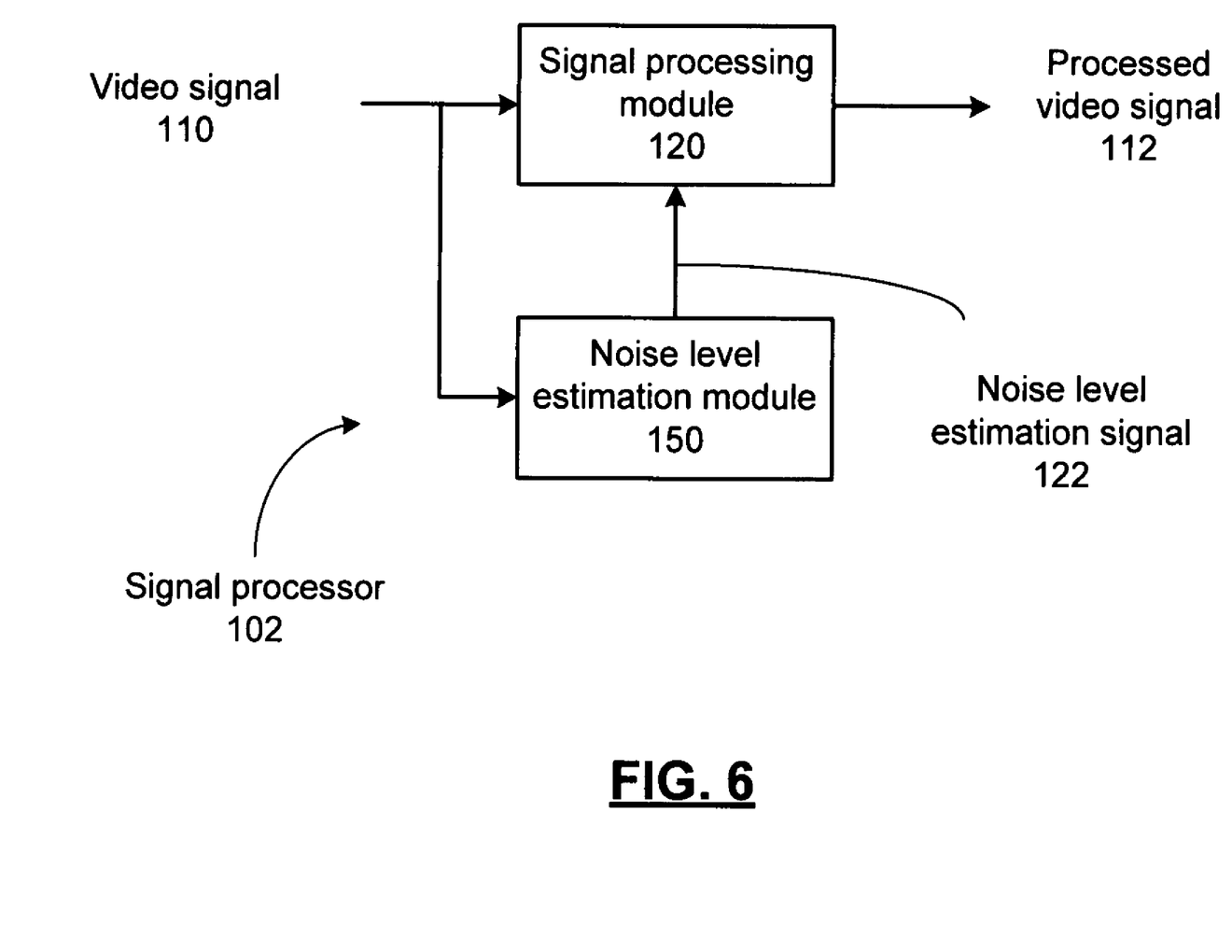
FIG. 6 presents a block diagram representation of a signal processor in accordance with an embodiment of the present invention.

Further details regarding the operation an implementation of signal processor 102 are presented in conjunction with FIG. 6 that follows.

Figure 5:
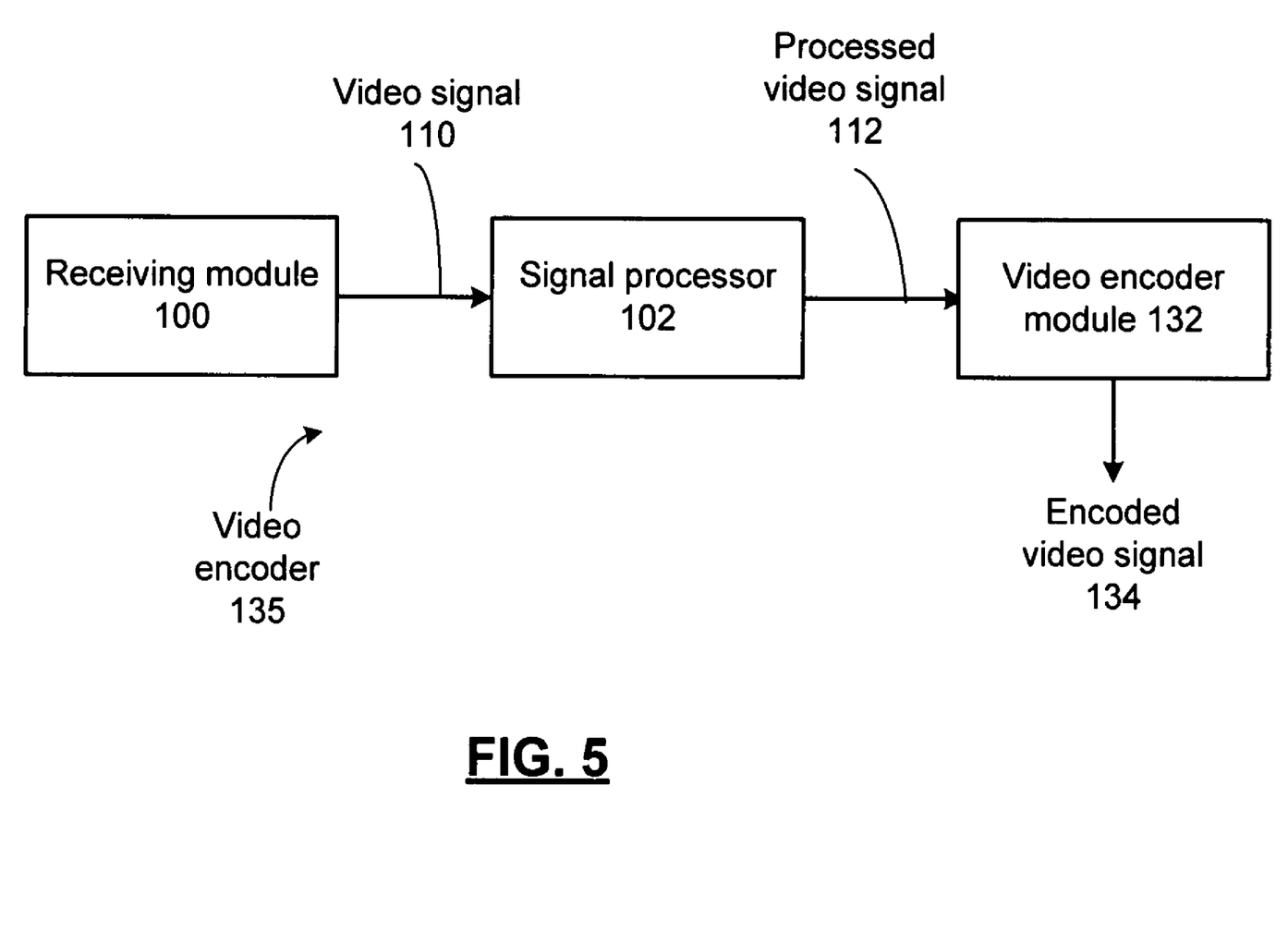
FIG. 5 presents a block diagram representation of a video encoder in accordance with an embodiment of the present invention.

FIG. 5 presents a block diagram representation of a video encoder in accordance with an embodiment of the present invention. In particular, a video encoder 135 is presented that includes receiving module 100 that produces a video signal 111 that can include an analog video signal that is formatted in any of a number of video formats including National Television Systems Committee (NTSC), Phase Alternating Line (PAL) or Sequentiel Couleur Avec Memoire (SECAM). Signal processor 102 produces a processed video signal 112 that is encoded by video encoding module 132 into an encoded video signal 134 in a digital video format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Encoded video signal 134 can be subsequently stored in a memory device, such as an integrated circuit memory either nonremovable or removable, such as a flash memory, memory card etc., a hard disk drive or on other removable media such as an optical disk in a format such as a digital video disk (DVD) format. Encoded video signal 134 can also be transmitted or otherwise distributed as a streaming video signal, broadcast signal or for other purposes.

In an embodiment of the present invention, video encoder module 132 can be implemented in hardware, firmware or software using a processing device that can be a separate processing device or a common processing device used for other purposes, such as the implementation of signal processor 102. Further details regarding the possible implementations of such a processing device are presented in conjunction with the description that follows.

FIG. 6 presents a block diagram representation of a signal processor in accordance with an embodiment of the present invention. In an embodiment of the present invention signal processor 102 includes a noise level estimation module 150 for generating a noise level estimation signal 122 from video signal 110.

Signal processing module 120 generates processed video signal 112 based on the noise level estimation signal 122. In an embodiment of the present invention, the signal processing module 120 includes a noise reduction filter such as a two-dimensional or three-dimensional noise filter that is adaptive to the estimated noise level, as provided by noise level estimation signal 122. In other embodiments, other noise adaptive processing such as a temporal motion detection, and/or spatial edge detection can likewise be implemented by signal processing module 120 in addition to, or in place of, the noise reduction filtering of signal processing module 120.

In an embodiment of the present invention, signal processor 102 is implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The signal processing module 120 and noise level estimation module 150 can be implemented as software, firmware or hardware, depending on the particular implementation of signal processor 102. It should also be noted that the software implementations of the present invention can be stored on a tangible storage medium such as a magnetic or optical disk, read-only memory or random access memory and also be produced as an article of manufacture.

Further details regarding the functions and features of noise level estimation module 150 are presented in conjunction with FIG. 6 that follows.

Figure 7:
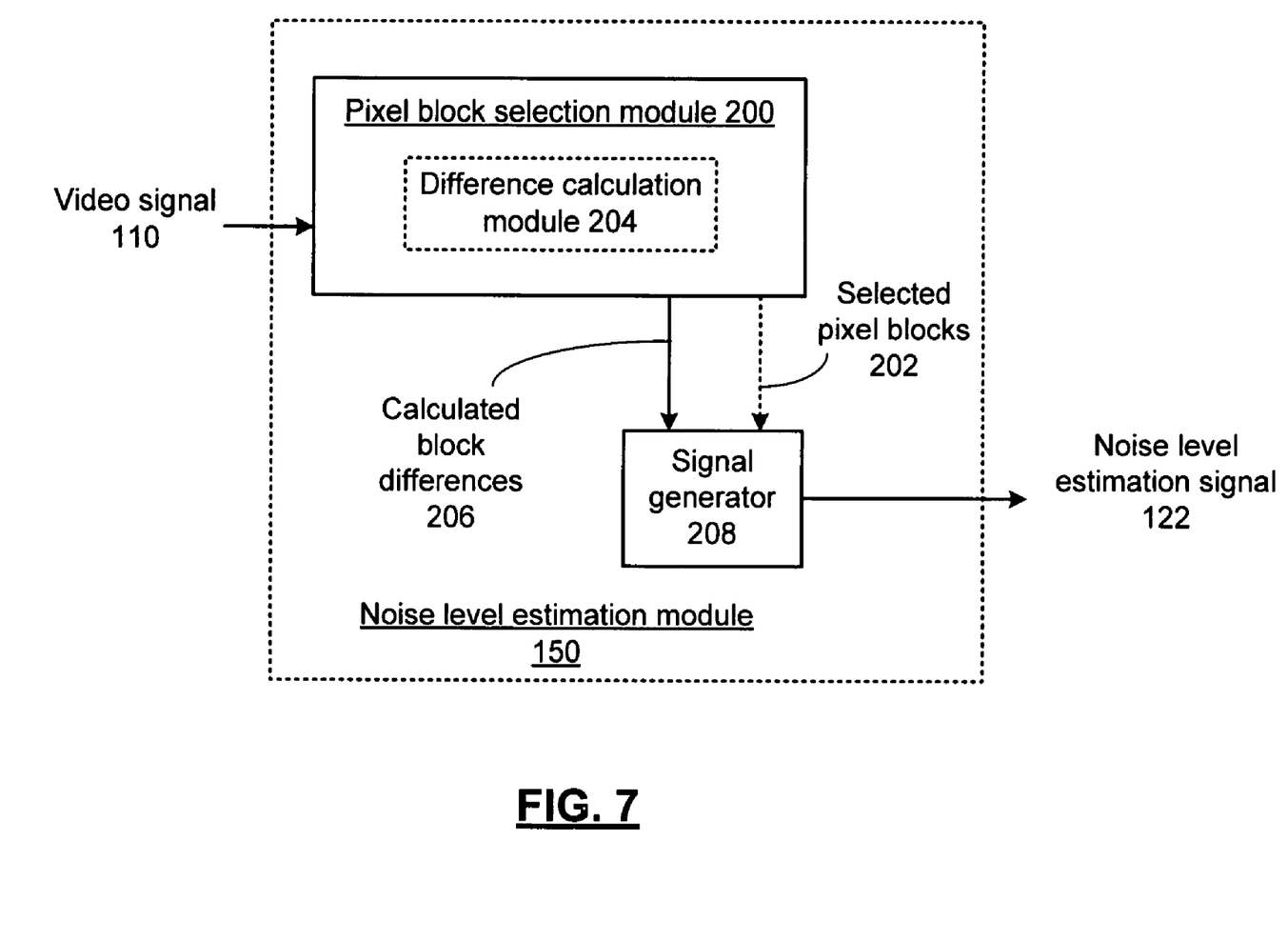
FIG. 7 presents a block diagram representation of a noise level estimation module in accordance with an embodiment of the present invention.

FIG. 7 presents a block diagram representation of a noise level estimation module in accordance with an embodiment of the present invention. In particular, noise level estimation module 150 includes a pixel block selection module 200 for selecting a plurality of selected pixel blocks 202 over a set of K fields of the video signal, each of the plurality of selected pixel blocks 202 containing a plurality of pixels having corresponding pixel values. Pixel block selection module 200 includes a difference calculation module 204 for calculating a block difference 206 for each of the plurality of selected pixel blocks 202 based on a pixel difference between the pixel value for each of the plurality of pixels and a pixel value for a corresponding pixel in an adjacent field having common field parity, and optionally for calculating other pixel block differences required in the selection of the K fields and the selection of the selected pixel blocks 202. Signal generator 208 is operably coupled to the difference calculation module 204 for generating noise level estimation signal 122 based on a subset of M block differences 206 for the plurality of selected pixel blocks 202, wherein M is greater than one and the M block differences are a subset of the block differences from the plurality of the selected pixel blocks.

Figure 8:
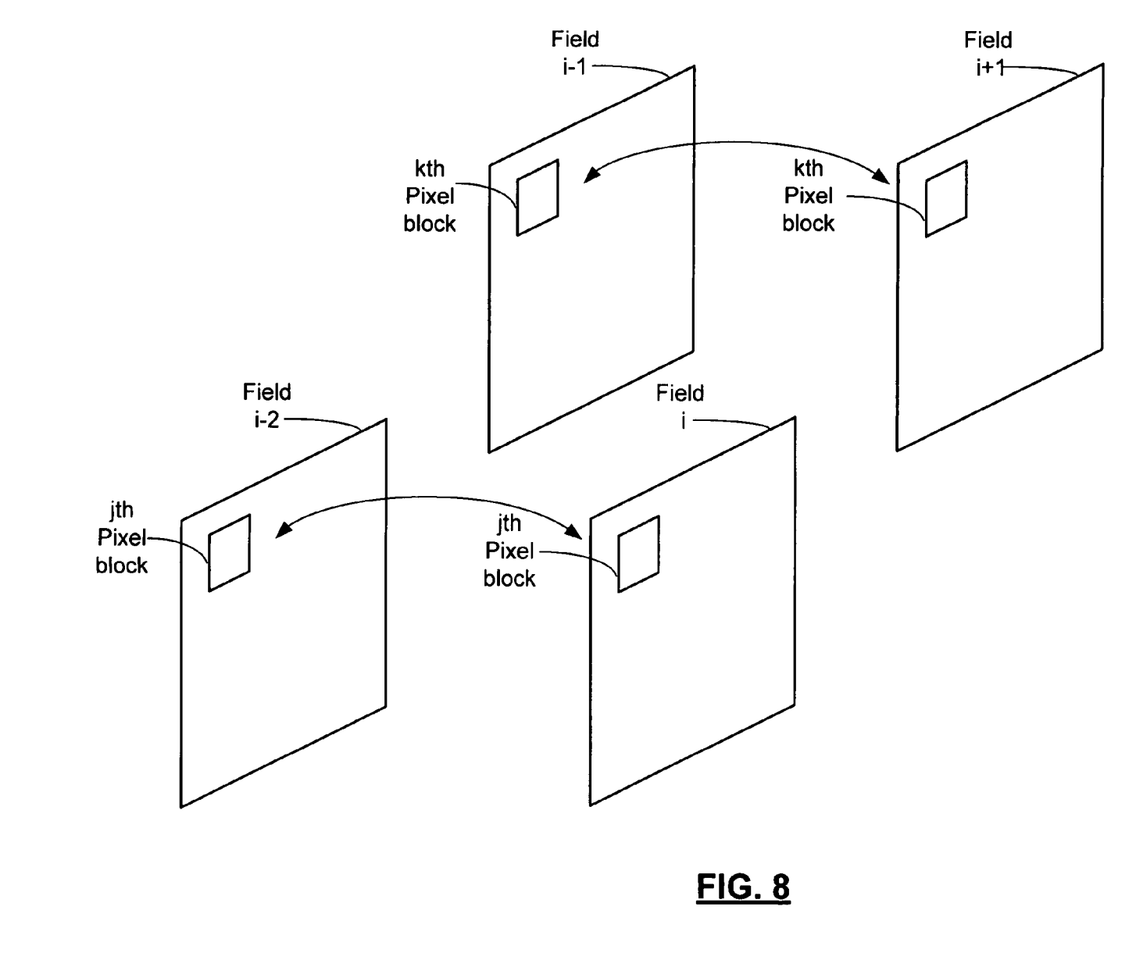
FIG. 8 presents a temporal representation of a set of fields of a video signal in accordance with an embodiment of the present invention.

FIG. 8 presents a temporal representation of a set of fields of a video signal in accordance with an embodiment of the present invention. In particular, a sequence of four fields (i−2, i−1, i, and i+1) of a video signal are presented that represent two fields (i−2 and i) of a first parity and two fields (i−1 and i+1) of a second parity. A particular pixel block (the jth pixel block) is shown as a rectangular block of contiguous pixels in fields i−2 and i, and a kth pixel block is shown as a rectangular block of contiguous pixels in fields i−1 and i+1. Difference calculation module 204 calculates a block difference for the jth pixel block of field i by averaging a pixel difference between each pixel value in jth pixel block of field i with the corresponding pixel value in the jth pixel block of field i−2.

In an embodiment of the present invention the pixel difference is proportional to the magnitude of the difference between the pixel value of a pixel in field i and the pixel value of the same pixel in field i−2. In an alternative embodiment of the present invention the pixel difference is proportional to the square of the difference between the pixel value of a pixel in field i and the pixel value of the same pixel in field i−2. The pixel differences are averaged over the jth block by summing the differences for each pixel in the block and optionally by dividing by the number of pixels in the jth pixel block to calculate the block difference for the jth block.

In a similar fashion, difference calculation module 204 calculates a block difference 206 for the kth pixel block of field i+1 by averaging (or summing) a pixel difference between each pixel value in kth pixel block of field i+1 with the corresponding pixel value in the kth pixel block of field i−1.

In an embodiment of the present invention the pixel blocks are chosen to have the same size, such as a 4×4 blocks, 8×8 blocks, 4×8 blocks, 16×1 blocks, 15×2 blocks etc. In this circumstance, the average can be calculated without dividing by the number of pixels, since each block difference would be divided by a constant.

Figure 9:
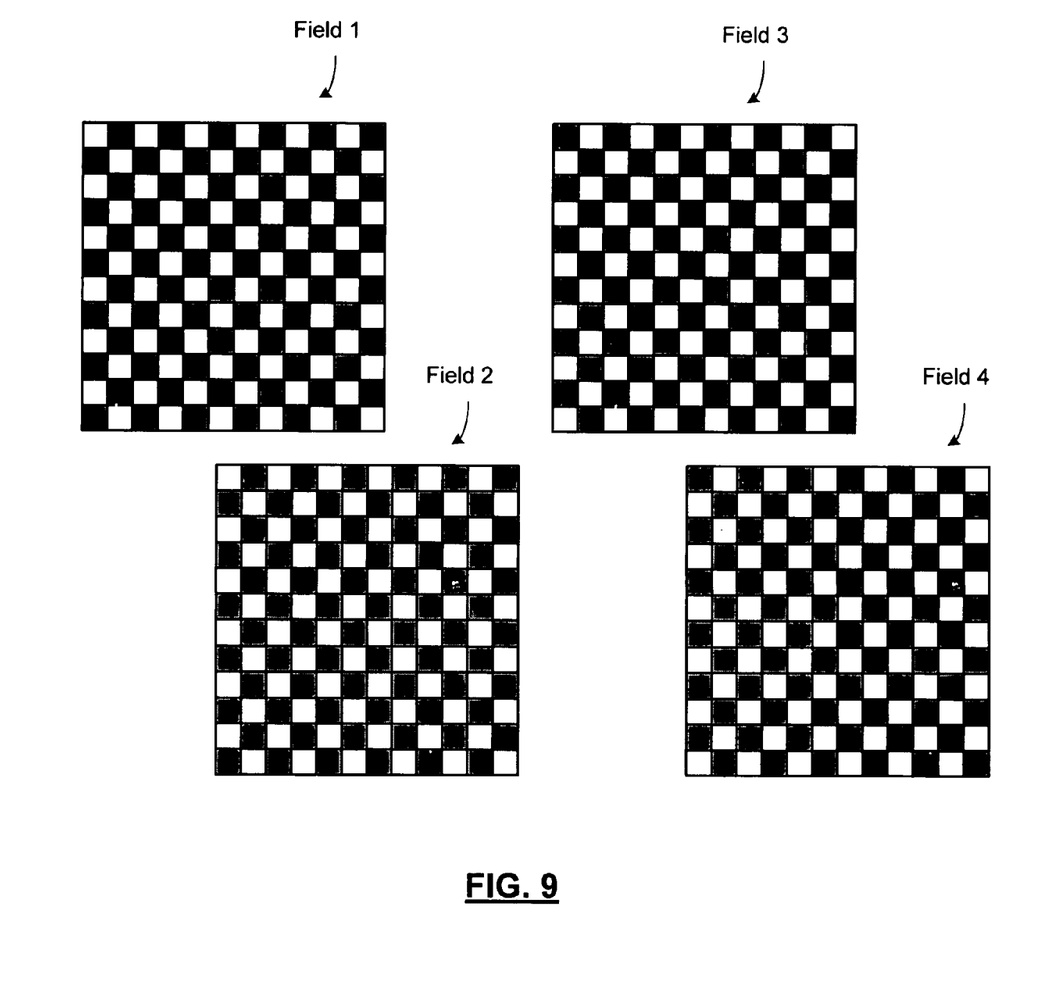
FIG. 9 presents a graphical representation of a plurality of pixel block patterns in accordance with an embodiment of the present invention.

FIG. 9 presents a graphical representation of a plurality of pixel block patterns in accordance with an embodiment of the present invention. Four consecutive fields, (fields 1-4) of a video signal are shown corresponding to a value of K=4 where fields 1 and 3 have the same parity and fields 2 and 4 have the same parity. Pixel block selection module 200 is further operable to select at least one pixel block from each field of the set of K fields in order to calculate a more accurate and more robust noise level estimation. While K=4 is shown in the example, any value of K>1 can likewise be used in the broad scope of the present invention.

In operation in accordance with an embodiment of the present invention, pixel block selection module 200 generates a pattern of pixel blocks for each field of the set of K fields, wherein the pattern for a first field of the set of K fields is different from the pattern for a second field of the set of K fields. In the example shown, each field is broken up into a grid of pixel blocks, such as the 12×12 grid that is shown, and the pattern consists of selecting every other pixel block (represented by the block being shaded) in the first field and by reversing the selected pixel blocks in the next field of the same parity. In this embodiment, each screen area of the video signal (and in this case each pixel of the screen) is covered by the pattern. This provides the advantage that the noise can be accurately estimated over the entire screen. However, as one of ordinary skill in the art will readily appreciate, many other patterns are likewise possible that allow each area of the screen to be covered by one or more fields in the pattern, given a choice of the pixel block size and shape, the value of K and the number of areas of the screen, and the number of pixels in the screen.

In an embodiment of the present invention, the selections from the patterns, such as the patterns described above, are used as selections of a preliminary set of pixel blocks over the set of K fields. Pixel block selection module 200 is further operable to identify when one of the preliminary set of pixel blocks has a block difference that compares unfavorably to a block difference threshold, deselect one of the preliminary set of pixel blocks when the block difference compares unfavorably to the block difference threshold, and to select the one of the preliminary set of pixel blocks when the block difference compares favorably to the block difference threshold. This allows the pixel block selection module to eliminate particular pixel blocks during the selection process where the noise levels could be significantly lower than the normal noise level reflected by other areas of the screen. For instance, areas with extremely high or extremely low luma values are usually less noisy than other areas of the screen and can skew the noise level estimation if not eliminated. In this circumstance, the block difference threshold can be set to correspond to the artificially low block difference of a block with extremely low or extremely high luma values.

In an embodiment of the present invention, pixel block selection module 200 is further operable to select a preliminary sequence of K consecutive fields of the video signal 110 and to identify when one of the preliminary sequence of K fields contains a scene change. When a scene change is identified in one of the preliminary sequence of K fields, pixel block selection module 200 forms the set of K fields by replacing the field containing the scene change with an alternative field of the video signal using the same pattern as the field that was replaced. When no field change is detected in the preliminary sequence of K fields, the set of K fields is formed from the preliminary sequence of K fields. This feature also improves the accuracy of the noise level estimate because block differences in a field experiencing a scene change are artificially high due to the scene change.

In an embodiment of the present invention, the scene change is detected when an average block difference for a plurality of pixel blocks of the field compares unfavorably to an average block difference threshold. In particular, the plurality of pixel blocks selected in the pattern for the particular field can be used for this purpose, however, a greater or lesser number of pixel blocks can likewise be used within the broad scope of the present invention. In a further embodiment of the present invention, when the average block difference compares unfavorably to an average block detection threshold an event signal can be generated that can be used to detect a scene change or to detect other events such as a reverse telecine (3:2 pull-down) conversion used in converting between video signal formats.

As a result of the selection process performed by pixel block selection module 200, a group of N selected pixel blocks 202 are selected over K fields of the video signal 110. In an embodiment of the present invention, a pixel block identifier and field identifier for each of the selected pixel blocks 202 are optionally provided to signal generator 208. In an embodiment of the present invention, the selected pixel blocks 202 exclude one or more fields than contain a scene change, cover all areas of the screen (but excluding pixel blocks having artificially low noise such as in areas of extremely high or low luma values). In addition, the block differences 206 of the selected pixel blocks 202 are provided to signal generator 208.

Figure 10:
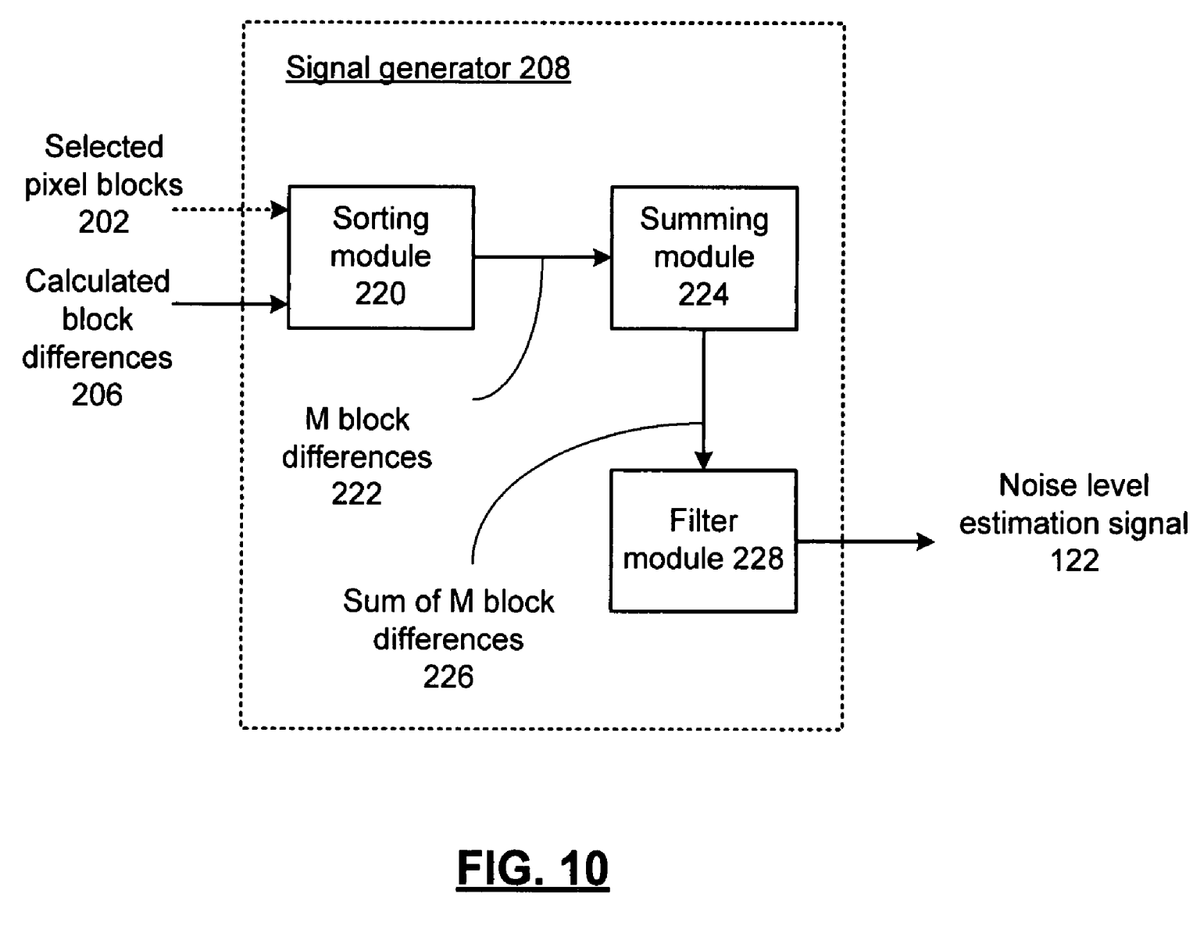
FIG. 10 presents a block diagram representation of a signal generator in accordance with an embodiment of the present invention.

FIG. 10 presents a block diagram representation of a signal generator in accordance with an embodiment of the present invention. In particular, signal generator 208 includes a sorting module 220 that selects the subset of M differences 222 by sorting the calculated block differences 206, such as in rank ordering, to determine the M lowest block differences. In an embodiment of the present invention M is an integer that is greater than one but is much smaller than N, the number of selected pixel blocks. In an embodiment of the present invention, N>10M, however, other values may likewise be used in other embodiments.

In an alternative embodiment of the present invention, sorting module 220 receives pixel block and field identifiers of selected pixel blocks 202. In the event the M lowest block differences correspond to a single small area of the screen, as determined by calculating a distance between the M lowest blocks, such as the maximum distance between any two blocks, a total distance between blocks or a mean distance between blocks, one or more of the M lowest blocks are replaced by a corresponding one or more blocks that are next in rank order until the calculated distance is above a distance threshold. Further, to the extent that the M lowest blocks each are from a single field of the set of K fields, one or more of the M lowest blocks are replaced by a corresponding one or more blocks that are next in rank order until a plurality of fields are represented, or optionally all of the fields are represented.

In further embodiments of the present invention the subset of M block differences can be calculated by M block differences that are otherwise substantially the M lowest block differences, e.g. by calculating the subset of M while optionally or selectively excluding a minority of the lowest block differences and by substituting other low block difference values.

Summing module 224 calculates the sum of the subset of M block differences 226 for the plurality of pixel blocks and optionally divides by M to calculate an average value. If M is constant, the sum and average of the M block differences are proportional to one another and either value could be used as long as the overall scaling of the resultant value is considered. In this circumstance, the sum of the subset of M block differences is a "current" estimate of the noise level of video signal 110 based on the span of the set of K fields. In an embodiment, signal generator 208 includes a filter module 228 for generating the noise level estimation signal based on the sum of the subset of M block differences taken over different sets of K fields of video signal 110. In an embodiment of the present invention filter module 228 includes a digital infinite impulse response (IIR) low pass filter of first order. However other filters including higher order filters, and alternative filter implementations, including finite impulse response filters that filter, average or otherwise smooth the noise level estimation signal 122 over multiple estimates of the noise level, can likewise be implemented as will be understood by one skilled in the art when presented the disclosure herein.

Figure 11:
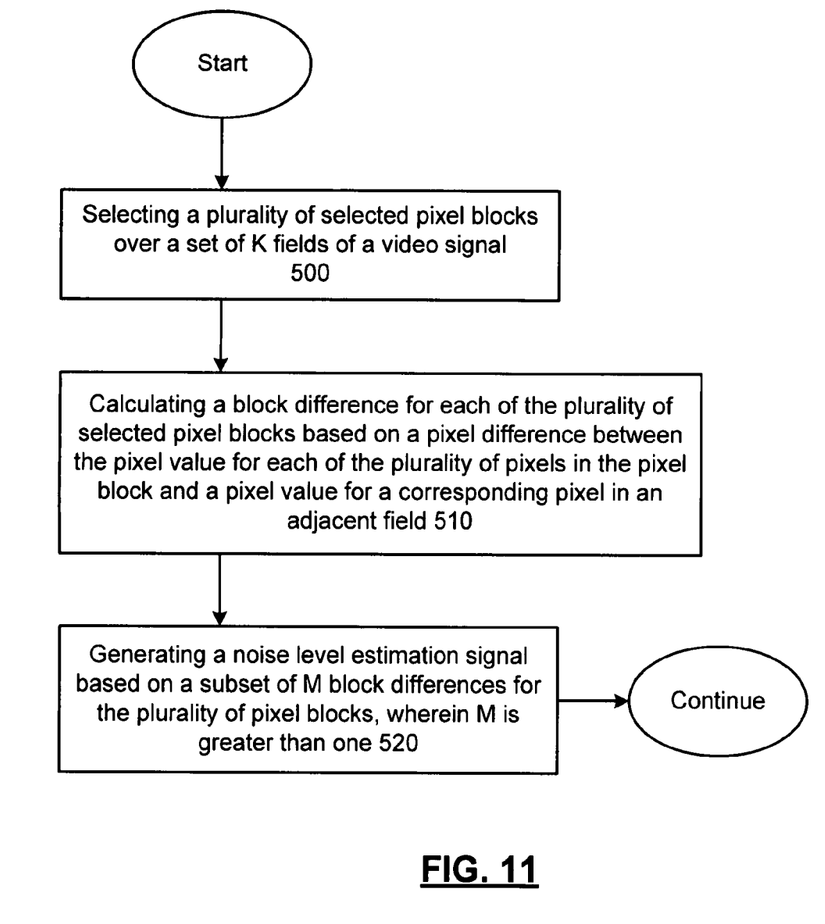
FIG. 11 presents a flowchart representation of a method in accordance with an embodiment of the present invention.

FIG. 11 presents a flowchart representation of a method in accordance with an embodiment of the present invention. In particular, a method is presented that can be used in conjunction with one or more of the features and functions presented in association with FIGS. 1-10. In step 500, a plurality of selected pixel blocks are selected over a set of K fields of a video signal, each of the plurality of selected pixel blocks containing a plurality of pixels having corresponding pixel values. In step 510, a block difference is calculated for each of the plurality of selected pixel blocks based on a pixel difference between the pixel value for each of the plurality of pixels and a pixel value for a corresponding pixel in an adjacent field. In step 520, a noise level estimation signal is generated based on a subset of M block differences for the plurality of pixel blocks, wherein M is greater than one and K is greater than one.

In an embodiment of the present invention, step 500 includes selecting at least one pixel block from each of the set of K fields. Further, the pixel difference is proportional to the magnitude of the difference between the pixel value for each of the plurality of pixels and a pixel value for a corresponding pixel in an adjacent field having common field parity. However, in an alternative embodiment, the pixel difference is proportional to the square of the difference between the pixel value for each of the plurality of pixels and a pixel value for a corresponding pixel in an adjacent field having common field parity.

In an embodiment of the present invention, step 520 includes selecting the subset of M block differences as the M substantially lowest block differences and by summing the M substantially lowest block differences for the plurality of pixel blocks. Further, the noise level estimation signal is calculated based on a current noise level estimate and one or more past values of the noise level estimation signal. More particularly, the noise level estimation signal can be calculated by low pass filtering the M substantially lowest block differences for the plurality of pixel blocks. In an embodiment, the number of selected pixel blocks is greater than 10M.

Figure 12:
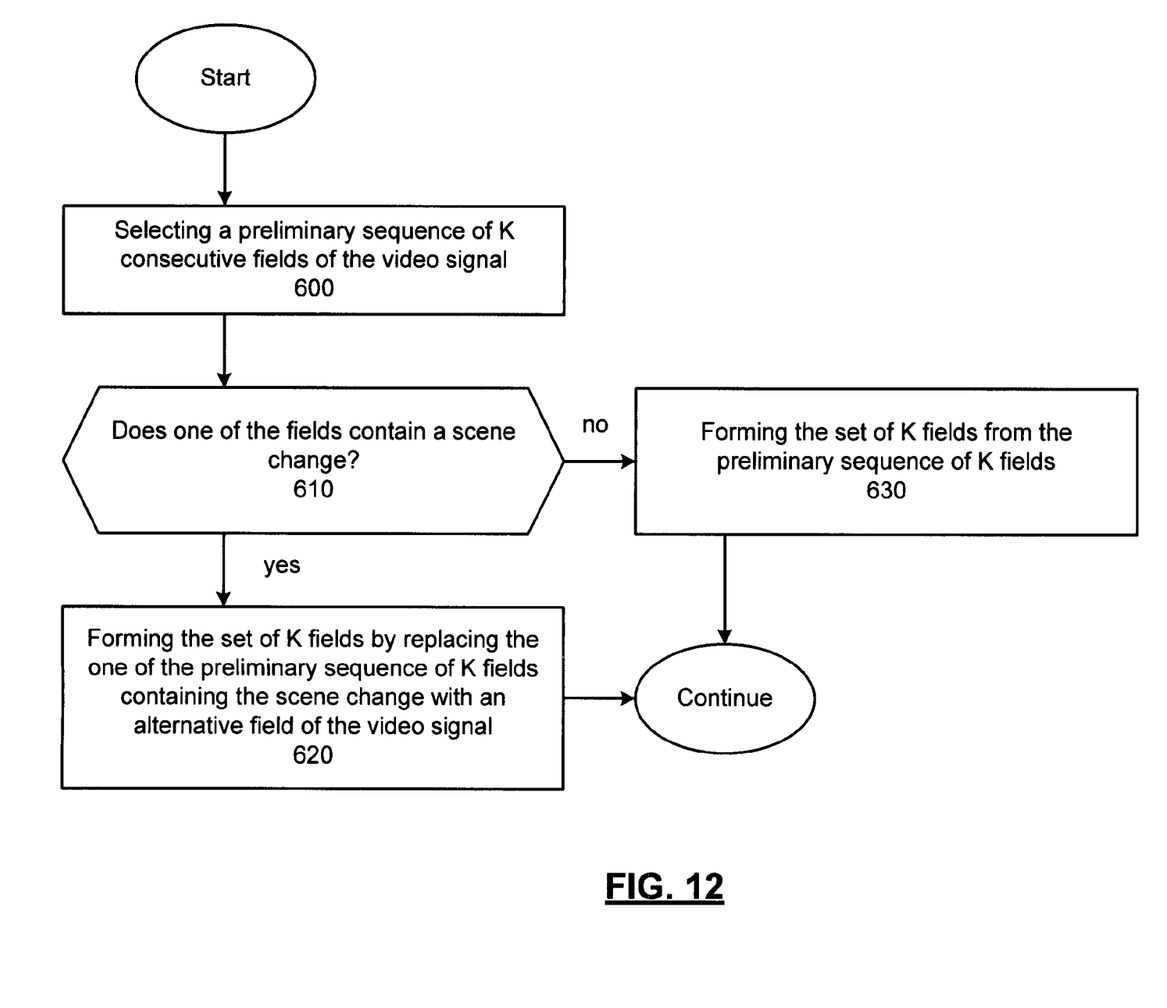
FIG. 12 presents a flowchart representation of a method in accordance with an embodiment of the present invention.

FIG. 12 presents a flowchart representation of a method in accordance with an embodiment of the present invention. A method is presented for use in conjunction with one or more of the features and functions described in association with FIGS. 1-10. In particular, a method is presented for use in step 500 of FIG. 11. In step 600, a preliminary sequence of K consecutive fields of the video signal is selected. In step 610, the method determines if one of the preliminary sequence of K fields contains a scene change. In step 620, the set of K fields is formed by replacing the one of the preliminary sequence of K fields containing the scene change with an alternative field of the video signal when a scene change is identified in one of the preliminary sequence of K fields. In step 630, the set of K fields is formed from the preliminary sequence of K fields when no scene change is identified in the preliminary sequence of K fields. In an embodiment of the present invention, the scene change is detected when an average block difference for a plurality of pixel blocks of the field compares unfavorably to an average block difference threshold.

Figure 13:
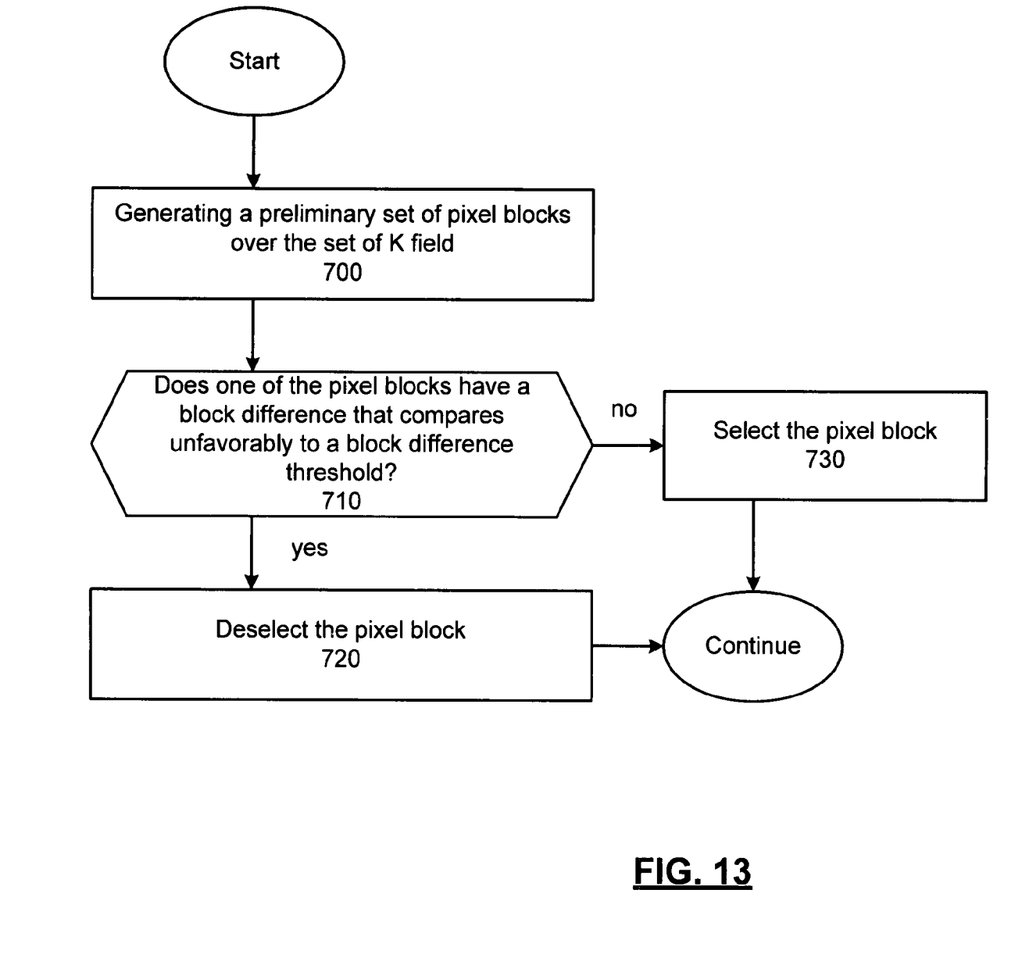
FIG. 13 presents a flowchart representation of a method in accordance with an embodiment of the present invention.

FIG. 13 presents a flowchart representation of a method in accordance with an embodiment of the present invention. A method is presented for use in conjunction with one or more of the features and functions described in association with FIGS. 1-10. In particular, a method is presented for use in step 500 of FIG. 11. In step 700, a preliminary set of pixel blocks over the set of K fields is generated. In step 710, the method determines if one of the preliminary set of pixel blocks has a block difference that compares unfavorably to a block difference threshold. In step 720, one of the preliminary set of pixel blocks is deselected when the block difference of that pixel block compares unfavorably to the block difference threshold. In step 730, one of the preliminary set of pixel blocks is selected when the block difference of that pixel block compares favorably to the block difference threshold.

Figure 14:
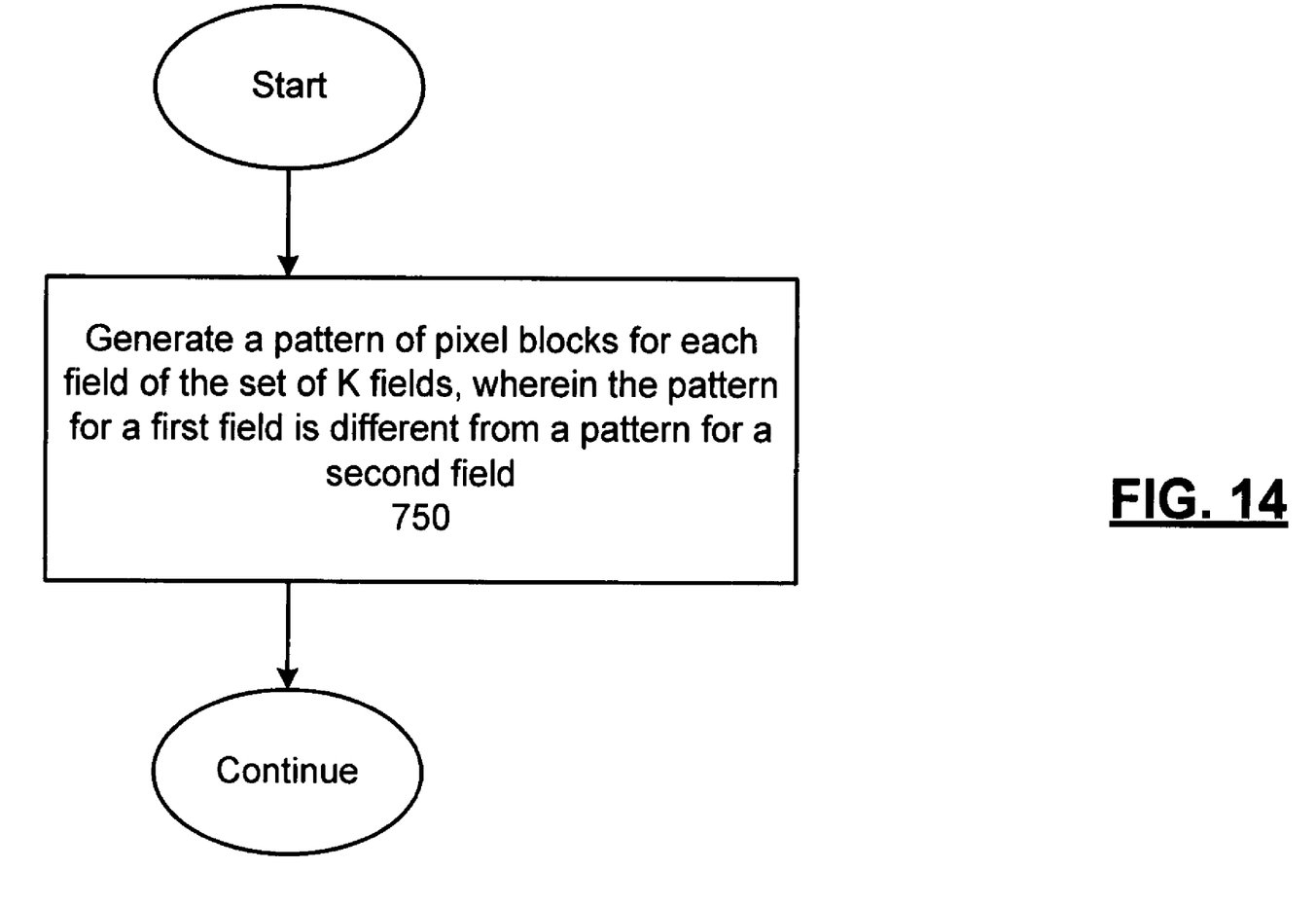
FIG. 14 presents a flowchart representation of a method in accordance with an embodiment of the present invention.

FIG. 14 presents a flowchart representation of a method in accordance with an embodiment of the present invention. A method is presented for use in conjunction with one or more of the features and functions described in association with FIGS. 1-10. In particular, a method is presented for use in step 500 of FIG. 11. In step 750, a pattern of pixel blocks for each field of the set of K fields is generated, wherein the pattern for a first field of the set of K fields is different from the pattern for a second field of the set of K fields. In an embodiment of the present invention, the video signal includes a plurality of screen areas and wherein each of the plurality of screen areas is covered by the pattern of one or more of the set of K fields.

Figure 15:
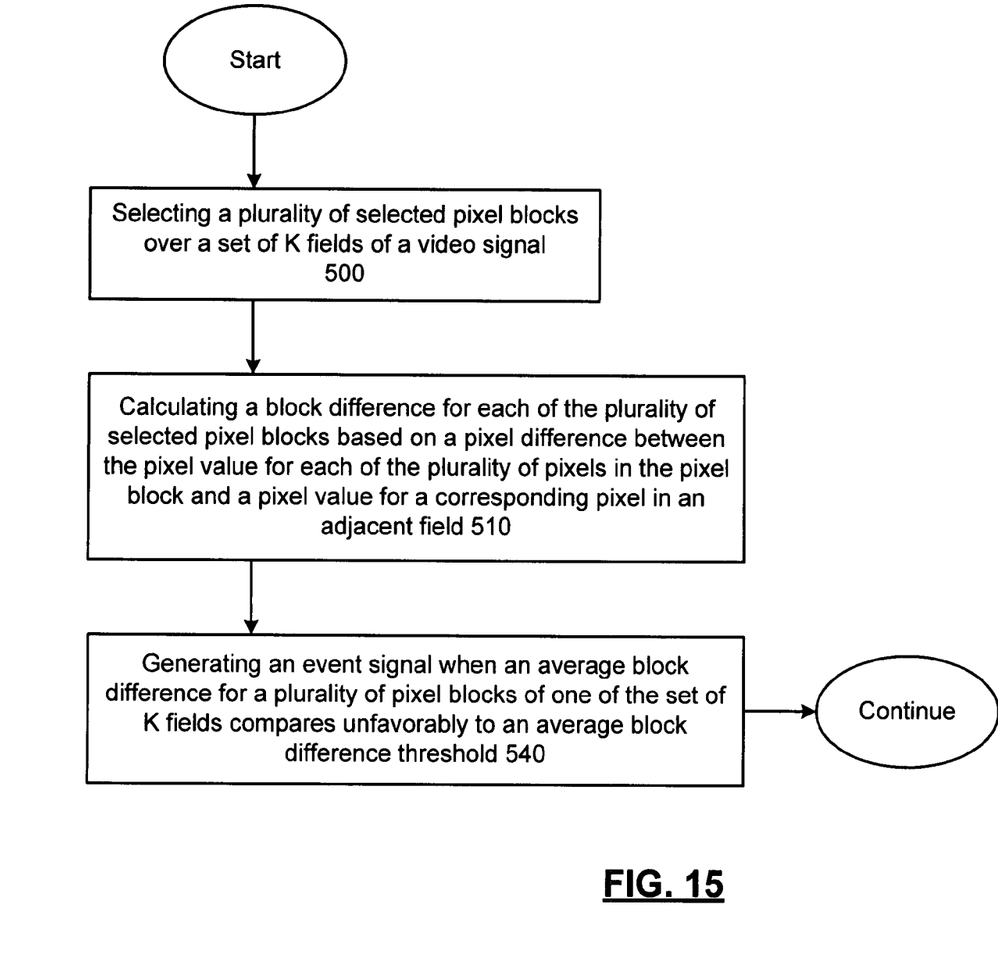
FIG. 15 presents a flowchart representation of a method in accordance with an embodiment of the present invention.

FIG. 15 presents a flowchart representation of a method in accordance with an embodiment of the present invention. A method is presented for use in conjunction with one or more of the features and functions described in association with FIGS. 1-14. The method includes steps 500 and 510 as previously described. In addition, the method includes step 540 of generating an event signal when an average block difference for a plurality of pixel blocks of one of the set of K fields compares unfavorably to an average block difference threshold. In an embodiment of the present invention, the event signal corresponds to a scene change or a reverse telecine conversion, however, the event signal can be used for other purposes as well.

In preferred embodiments, the various circuit components are implemented using 0.35 micron or smaller CMOS technology. Provided however that other circuit technologies both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a noise level estimation module video encoder and a video display device. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A noise level estimation module comprising:
   a pixel block selection module for selecting a plurality of selected pixel blocks over a set of K fields of a video signal, each of the plurality of selected pixel blocks containing a plurality of pixels having corresponding pixel values, the pixel block selection module having a difference calculation module for calculating a block difference for each of the plurality of selected pixel blocks based on a pixel difference between the pixel value for each of the plurality of pixels and a pixel value for a corresponding pixel in an adjacent field;
   a signal generator, operably coupled to the difference calculation module for generating a noise level estimation signal based on a subset of M block differences for the plurality of pixel blocks, wherein the signal generator selects the subset of M block differences by selecting the M substantially lowest block differences for the plurality of pixel blocks and generates the noise level estimation signal by summing the subset of M block differences, and wherein M is greater than one and K is greater than one.

2. The noise level estimation module of claim 1 wherein the pixel block selection module is further operable to select a preliminary sequence of K consecutive fields of the video signal, identify when one of the preliminary sequence of K fields contains a scene change, to form the set of K fields by replacing the one of the preliminary sequence of K fields containing the scene change with an alternative field of the video signal when a scene change is identified in one of the preliminary sequence of K fields, and to form the set of K fields from the preliminary sequence of K fields when no scene change is identified in the preliminary sequence of K fields.

3. The noise level estimation module of claim 2 wherein the scene change is detected when an average block difference for a plurality of pixel blocks of the field compares unfavorably to an average block difference threshold.

4. The noise level estimation module of claim 1 wherein the pixel block selection module is further operable to generate a preliminary set of pixel blocks over the set of K fields, identify when one of the preliminary set of pixel blocks has a block difference that compares unfavorably to a block difference threshold, deselect the one of the preliminary set of pixel blocks when the block difference compares unfavorably to the block difference threshold, and to select the one of the preliminary set of pixel blocks when the block difference compares favorably to the block difference threshold.

5. The noise level estimation module of claim 1 wherein the pixel block selection module is further operable to select at least one pixel block from each of the set of K fields.

6. The noise level estimation module of claim 5 wherein the pixel block selection module is further operable to generate a pattern of pixel blocks for each field of the set of K fields, wherein the pattern for a first field of the set of K fields is different from the pattern for a second field of the set of K fields.

7. The noise level estimation module of claim 6 wherein the video signal includes a plurality of screen areas and wherein each of the plurality of screen areas is covered by the pattern of one or more of the set of K fields.

8. The noise level estimation module of claim 1 wherein the pixel difference is proportional to the magnitude of the difference between the pixel value for each of the plurality of pixels and a pixel value for a corresponding pixel in an adjacent field having common field parity.

9. The noise level estimation module of claim 1 wherein the pixel difference is proportional to the square of the difference between the pixel value for each of the plurality of pixels and a pixel value for a corresponding pixel in an adjacent field having common field parity.

10. The noise level estimation module of claim 1 wherein the signal generator is further operable to generate the noise level estimation signal based on a current noise level estimate and one or more past values of the noise level estimation signal.

11. The noise level estimation module of claim 10 wherein the signal generator includes a low-pass filter for generating the noise level estimation signal based on the subset of M block differences for the plurality of pixel blocks.

12. The noise level estimation module of claim 1 wherein the number of selected pixel blocks is greater than 10M.

13. A method comprising:
   selecting a plurality of selected pixel blocks over a set of K fields of a video signal, each of the plurality of selected pixel blocks containing a plurality of pixels having corresponding pixel values, wherein the plurality of selected pixel blocks includes selecting at least one pixel block from each of the set of K fields;
   calculating a block difference for each of the plurality of selected pixel blocks based on a pixel difference between the pixel value for each of the plurality of pixels and a pixel value for a corresponding pixel in an adjacent field;

generating a noise level estimation signal based on a subset of M block differences for the plurality of pixel blocks, wherein M is greater than one and K is greater than one.

14. The method of claim 13 wherein the step of selecting the plurality of selected pixel blocks includes:
   selecting a preliminary sequence of K consecutive fields of the video signal;
   identifying when one of the preliminary sequence of K fields contains a scene change;
   forming the set of K fields by replacing the one of the preliminary sequence of K fields containing the scene change with an alternative field of the video signal when a scene change is identified in one of the preliminary sequence of K fields; and
   forming the set of K fields from the preliminary sequence of K fields when no scene change is identified in the preliminary sequence of K fields.

15. The method of claim 14 wherein the scene change is detected when an average block difference for a plurality of pixel blocks of the field compares unfavorably to an average block difference threshold.

16. The method of claim 13 wherein the step of selecting the plurality of selected pixel blocks includes:
   generating a preliminary set of pixel blocks over the set of K fields;
   identifying when one of the preliminary set of pixel blocks has a block difference that compares unfavorably to a block difference threshold;
   deselecting the one of the preliminary set of pixel blocks when the block difference compares unfavorably to the block difference threshold; and
   selecting the one of the preliminary set of pixel blocks when the block difference compares favorably to the block difference threshold.

17. The method of claim 13 wherein the step of selecting the plurality of selected pixel blocks includes:
   generating a pattern of pixel blocks for each field of the set of K fields;
   wherein the pattern for a first field of the set of K fields is different from the pattern for a second field of the set of K fields.

18. The method of claim 17 wherein the video signal includes a plurality of screen areas and wherein each of the plurality of screen areas is covered by the pattern of one or more of the set of K fields.

19. The method of claim 13 wherein the pixel difference is proportional to the magnitude of the difference between the pixel value for each of the plurality of pixels and a pixel value for a corresponding pixel in an adjacent field having common field parity.

20. The method of claim 13 wherein the pixel difference is proportional to the square of the difference between the pixel value for each of the plurality of pixels and a pixel value for a corresponding pixel in an adjacent field having common field parity.

21. The method of claim 13 wherein the step of generating a noise level estimation signal includes selecting the subset of M block differences by selecting the M substantially lowest block differences for the plurality of pixel blocks and summing the subset of M block differences.

22. The method of claim 13 wherein the noise level estimation signal is calculated based on a current noise level estimate and one or more past values of the noise level estimation signal.

23. The method of claim 22 wherein the noise level estimation signal is calculated by low pass filtering the subset of M block differences for the plurality of pixel blocks.

24. The method of claim 13 wherein the number of selected pixel blocks is greater than 10M.

25. A method comprising:
   selecting a plurality of selected pixel blocks over a set of K fields of a video signal, each of the plurality of selected pixel blocks containing a plurality of pixels having corresponding pixel values;
   calculating a block difference for each of the plurality of selected pixel blocks based on a pixel difference between the pixel value for each of the plurality of pixels and a pixel value for a corresponding pixel in an adjacent field, wherein the pixel difference is proportional to the square of the difference between the pixel value for each of the plurality of pixels and a pixel value for a corresponding pixel in an adjacent field having common field parity;
   generating an event signal when an average block difference for a plurality of pixel blocks of one of the set of K fields compares unfavorably to an average block difference threshold.

26. The method of claim 25 wherein the step of selecting the plurality of selected pixel blocks includes:
   generating a preliminary set of pixel blocks over the set of K fields;
   identifying when one of the preliminary set of pixel blocks has a block difference that compares unfavorably to a block difference threshold;
   deselecting the one of the preliminary set of pixel blocks when the block difference compares unfavorably to the block difference threshold; and
   selecting the one of the preliminary set of pixel blocks when the block difference compares favorably to the block difference threshold.

27. The method of claim 25 wherein the step of selecting the plurality of selected pixel blocks includes:
   generating a pattern of pixel blocks for each field of the set of K fields;
   wherein the pattern for a first field of the set of K fields is different from the pattern for a second field of the set of K fields.

28. The method of claim 27 wherein the video signal includes a plurality of screen areas and wherein each of the plurality of screen areas is covered by the pattern of one or more of the set of K fields.

29. The method of claim 25 wherein the pixel difference is proportional to the magnitude of the difference between the pixel value for each of the plurality of pixels and a pixel value for a corresponding pixel in an adjacent field having common field parity.

30. The method of claim 25 wherein the event signal corresponds to one of: a scene change and a reverse telecine conversion.

* * * * *